Sept. 25, 1951 B. M. HADFIELD 2,569,000

FREQUENCY SELECTIVE CIRCUIT

Filed March 24, 1945 4 Sheets-Sheet 1

INVENTOR
BERTRAM MORTON HADFIELD

BY Chas. W. Candy

ATTORNEY

Sept. 25, 1951 B. M. HADFIELD 2,569,000

FREQUENCY SELECTIVE CIRCUIT

Filed March 24, 1945 4 Sheets-Sheet 2

INVENTOR
BERTRAM MORTON HADFIELD

BY Chas. L. Candy.

ATTORNEY

INVENTOR
BERTRAM MORTON HADFIELD
BY Chas. Tn. Conly
ATTORNEY

FREQUENCY SELECTIVE CIRCUIT

Filed March 24, 1945 4 Sheets-Sheet 4

INVENTOR
BERTRAM MORTON HADFIELD
BY Chas. Tu. Candy
ATTORNEY

Patented Sept. 25, 1951

2,569,000

UNITED STATES PATENT OFFICE 2,569,000

FREQUENCY SELECTIVE CIRCUIT

Bertram Morton Hadfield, Harrow Weald, England, assignor to Automatic Electric Laboratories Inc., Chicago, Ill., a corporation of Delaware Application March 24, 1945, Serial No. 584,699
In Great Britain May 22, 1944

15 Claims. (Cl. 250—27)

The present invention concerns improvements in and relating to frequency selective circuits and has for its object the provision of circuit means whereby simple electrical resonant circuits having low magnification factors (e. g. low Q values) are enabled to give very large attenuations at frequencies removed from resonance in both transient and steady states of the circuit and without materially affecting the usable transient and steady state responses at around resonance or vice versa. Another object is to enable an infinite steady state attenuation to be obtained at given frequencies remote from resonance without materially affecting the near-resonance response or vice versa. The invention enables the use of simple resonant circuit selection in multi-channel signalling systems in which the respective carrier frequencies for each channel are modulated by the desired intelligence.

According to one feature of the invention, two resonant circuits having different magnification factors but the same resonance frequency are arranged so that their respective outputs at the resonance frequency are proportional to their magnification factors and the net output from the circuit is proportional to the difference in their respective outputs.

The net output of the circuit may be comprised by the difference of the respective alternating outputs of the two resonant circuits or by the difference of the rectified outputs of the two resonant circuits.

The proportionality of the respective outputs of the two resonant circuits may be so arranged that, in the case where the difference of the alternating outputs is taken a substantially zero, net output is obtained at given frequency ratios from resonance, and in the case where the difference of the rectified outputs is taken a truly zero net output is obtained at given frequency ratios from resonance.

A further development of the invention concerns the provision of individual simple smoothing circuits to which the unsmoothed rectified signal voltages are applied so that the combined direct current output is arranged to be proportional to the difference of the individual values of the outputs or the smoothing circuits being so designed that transient interference produced by signal cessations in adjacent channels is reduced to zero or substantially so without materially affecting the required operation over the normal signal bandwidth.

Figures 1, 2, 3, 4, 5, 6:
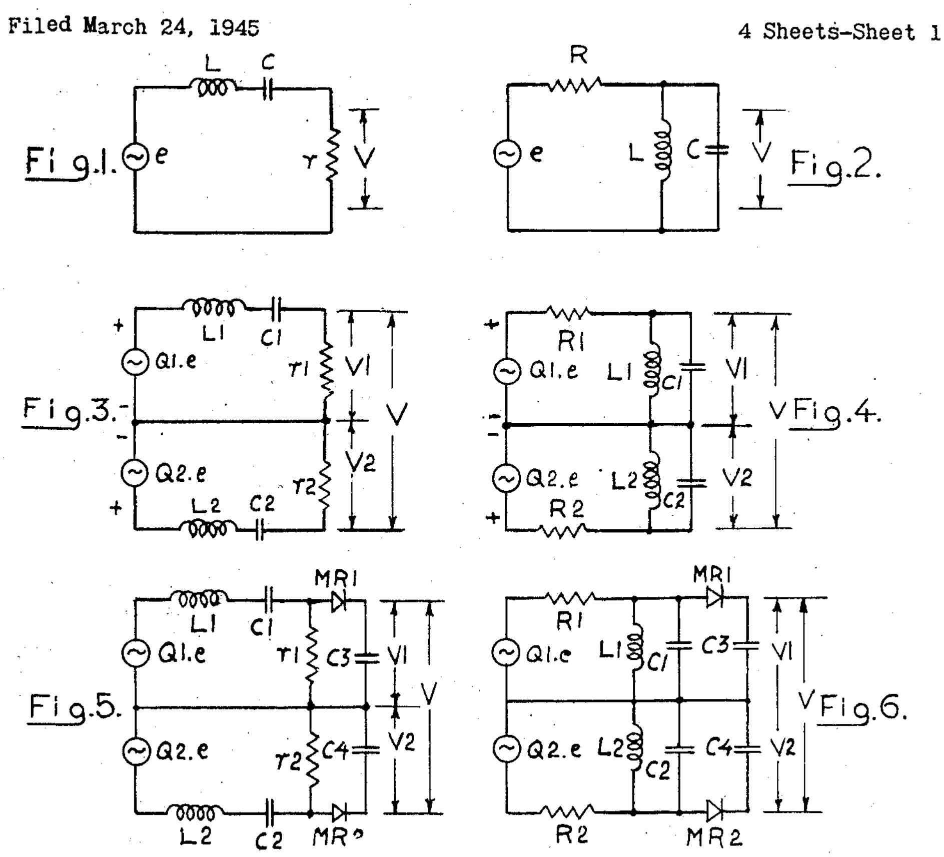
Figure 8:
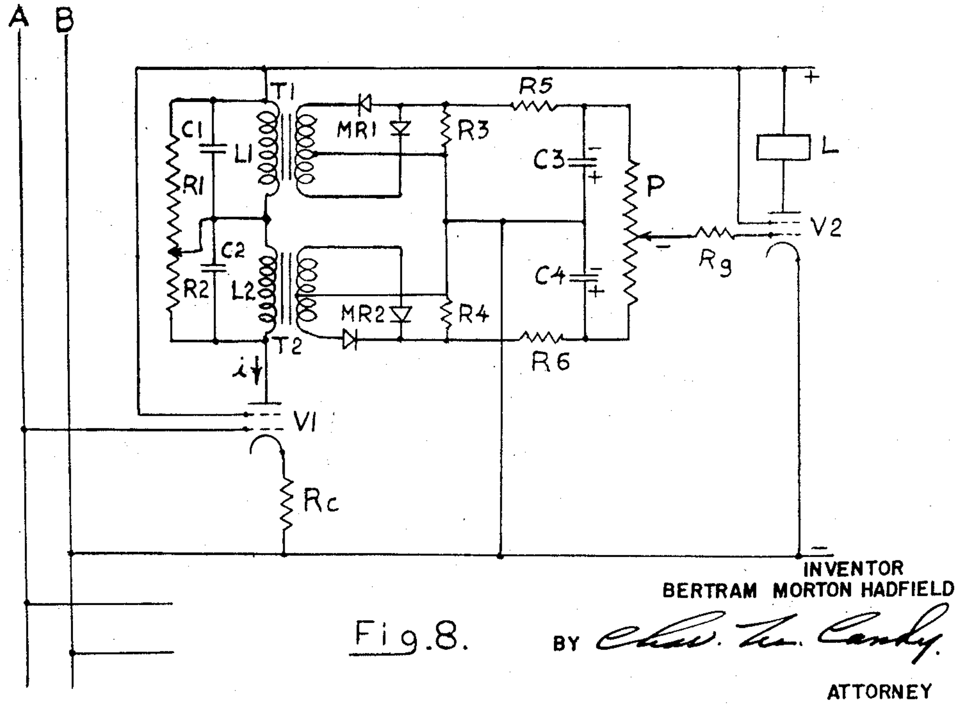
Figure 7:
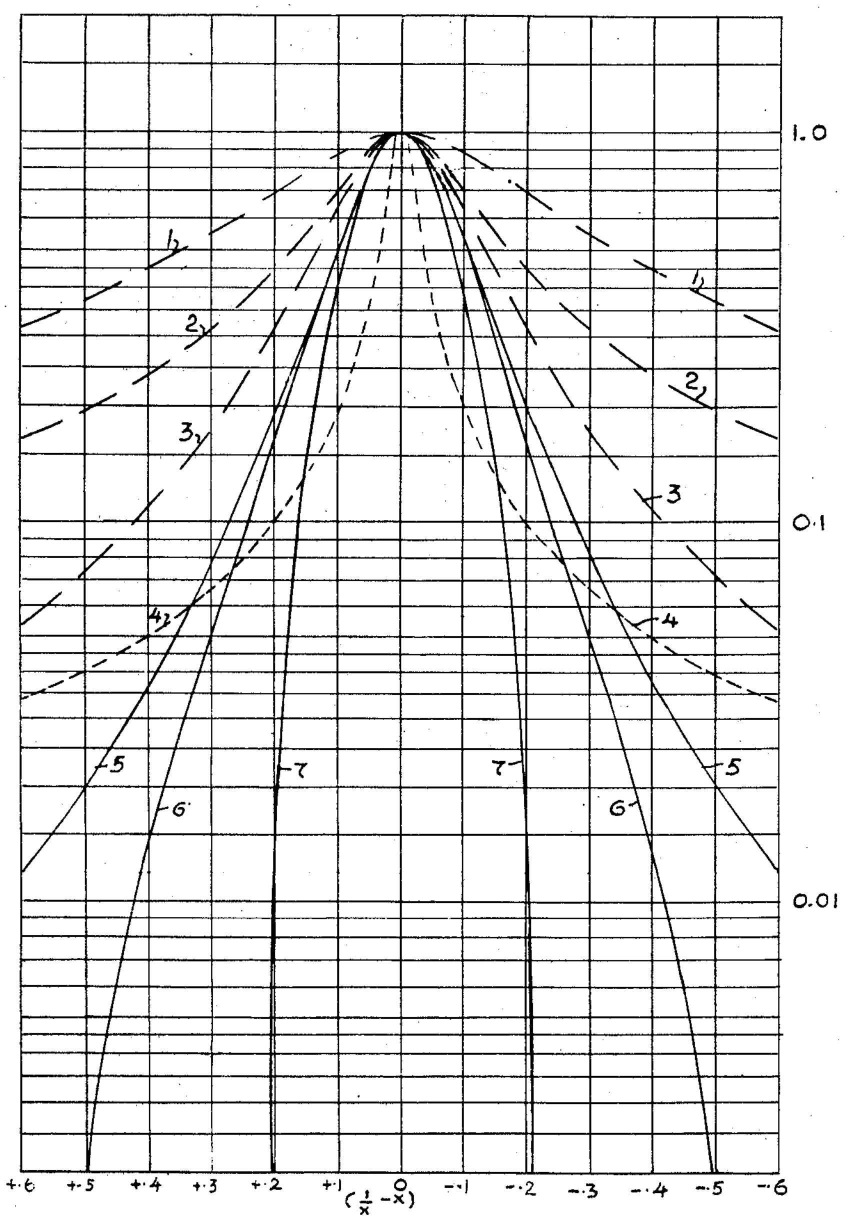
Figure 9:
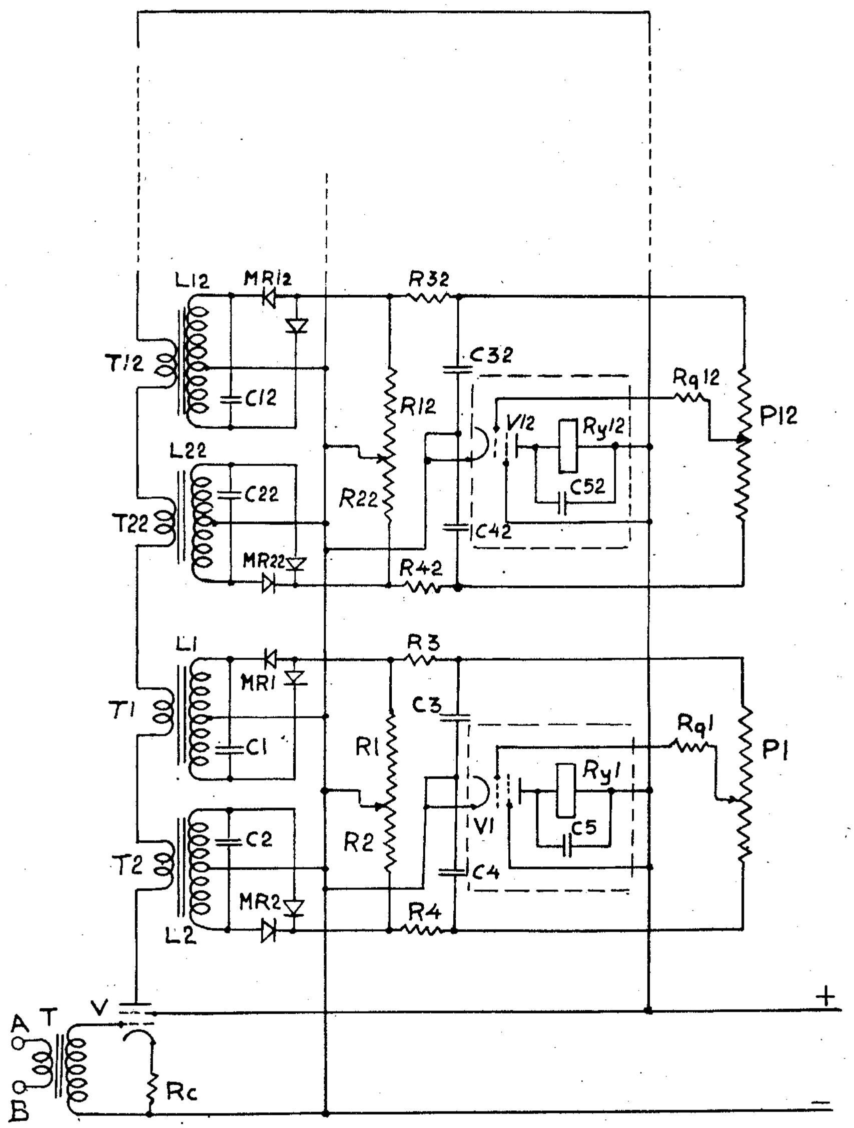

The invention will be better understood by referring to the accompanying drawings in which Figs. 1 and 2 are known frequency selective circuits and Figs. 3, 4, 5 and 6 are examples of frequency selective circuits according to the invention. Fig. 7 illustrates the comparative response of various kinds of frequency selective circuits. Fig. 8 illutrates in detail a frequency selective arrangement. Fig. 9 illustrates in detail a multi-frequency selective arrangement.

Figure 10:
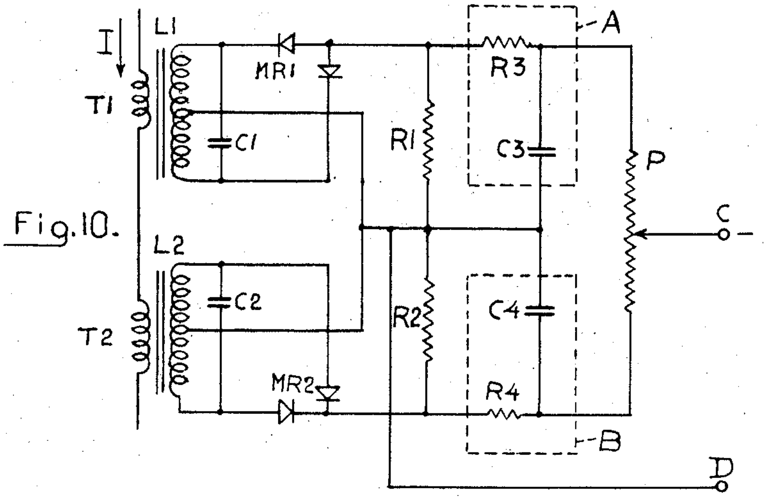
Figure 11:
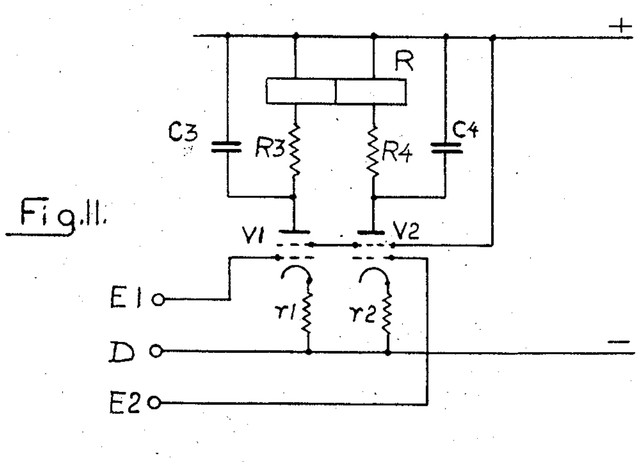
Figure 12:
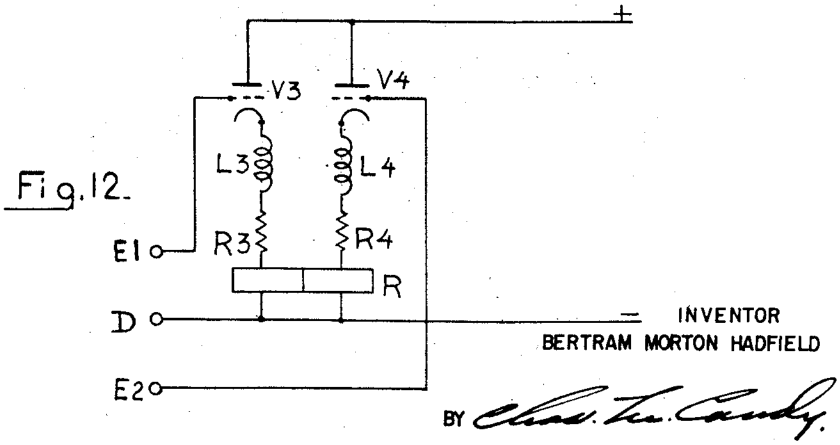

Fig. 10 illustrates one further development of the invention employing simple smoothing circuits. Figs. 11 and 12 illustrate modifications of the development illustrated in Fig. 10 in which the smoothing circuits are located in the anode or cathode circuit of a valve.

In order that a better appreciation of the invention may be obtained, reference will now be made to the steady state output of simple resonant circuits, of which the two fundamental configurations are shown in Figs. 1 and 2. Fig. 1 shows a series resonant circuit comprised by inductance L, capacitance C, and resistance $r$ energised by an alternating source of zero resistance and voltage $e$. Fig. 2 shows a parallel resonant circuit comprised by inductance L, capacitance C, and fed from the alternating source $e$ via the resistance R. If the output voltage V be taken as shown in either case, then the expression for V in terms of $e$ at any frequency is of the same form in both cases provided the magnification factor Q is denoted by the ratio $Wo.L/r$ for Fig. 1 and by the ratio $R/Wo.L$ for Fig. 2; where Wo is the resonant frequency in radians per second given by $1/\sqrt{L.C.}$ Similarly the expression for the voltage on C and the current in L in Figs. 1 and 2 respectively, or the expression for the voltage on L and the current in C in Figs. 1 and 2 respectively, are of the same form; the present discussion will take the voltage V as shown as being typical of the steady state response.

If $x$ be the ratio of the impressed frequency W to the resonant frequency Wo, $j$ is $\sqrt{-1}$ and Q be as defined above, then the common form for the voltage V in terms of $e$ is:

$$V=\frac{e}{1-j.Q(1/x-x)} \qquad (1)$$

and if $Q(1/x-x)$ be put equal to the number $y$, then:

$$\frac{V}{e}=\frac{1}{1-j.y} \qquad (2)$$

From this it will be seen that $y$ increases as $x$ departs from 1 (i. e. as the impressed frequency differs from the resonant frequency), and when $y$ becomes very much larger than 1, the magnitude of V is given by $1/y$ and its phase angle is 90° with respect to $e$.

Now if $e$ be raised to $Q.e$ volts, then it will be apparent from (1) that when $y$ is very much larger than 1, the voltage V is independent of Q, and is only a function of $x$.

Thus if two resonant circuits of different Q values be each energized with voltages proportional to their respective Q values, and have the same resonant frequency, then the respective outputs will tend to become equal as the impressed frequency departs from resonance. Hence the difference between the respective voltages V will tend to zero for frequencies removed from resonance, but will have a value proportional to the difference in Q's at and near resonance. This state of affairs is shown schematically in Figs. 3, 4, 5 and 6, where the upper circuits have Q values of Q1 and are fed with $Q1.e$ volts, and the lower circuits have Q values of Q2 and are fed with $Q2.e$ volts; the remaining symbols corresponding to those shown in Fig. 1 or 2. Figs. 3 and 4, the difference of the alternating voltages V1 and V2 is taken for the output V, by arranging the phases of the inputs as shown by the plus and minus signs. In Figs. 5 and 6, the difference of the magnitudes is taken by means of the rectifying circuits MR1, C3, and MR2, C4; the input phases being then immaterial.

The action of the circuit in giving increased attenuation at frequencies removed from resonance, is greater in the case when the difference in magnitudes is taken (Figs. 5 and 6), since such action then depends on $y^2$ being much greater than 1, instead of $y$ being much greater than 1 as for the difference of the alternating voltages (Figs. 3 and 4). As in most signalling systems the desired intelligence is conveyed by the modulations of the carrier frequency, and subsequent rectification or demodulation is necessary, the necessary rectification implied when the difference of the magnitudes is taken with the present invention is no disadvantage. Hence the following further description of the invention will assume that the difference in magnitudes is taken.

It should be noted that from a practical point of view it is equally feasible to use the difference voltages on, or currents in, the remaining circuit elements of the two resonant circuits, provided the elements chosen are of similar nature and that in this case the impressed voltages can be of the same magnitude because the expression for output voltage will now have a multiplying Q factor in the numerator. For instance, if in Figs. 3 and 5, L1, r1, and L2, r2, are respectively transposed, then the voltage V1 at resonance will be Q1 times the input, and V2 will be Q2 times its input, so that the inputs will then need to be $e$ in each case. For frequencies removed from resonance, the voltages V1 and V2 tend to become the same and dependent mainly on $x$, as before. Similar remarks apply to transposing C1 with r1, and C2 with r2. As regards Figs. 4 and 6, the differences in the currents in L1 and L2, or in C1 and C2 may be taken, if convenient, but again and since the steady state expressions already include a Q factor in the numerator, the input voltages may now be equal.

As regards the form of the resultant differential output with variation of input frequency, and taking the magnitudes only, we have:

$$\left|\frac{V1}{e}\right|-\left|\frac{V2}{e}\right|=\frac{Q1}{\sqrt{1+(Q1(1/x-x))^2}}-\frac{Q2}{\sqrt{1+(Q2(1/x-x))^2}}$$

which must be divided by (Q1−Q2), if the fractional output with respect to unity at resonance is desired. Hence letting $Q2=p.Q1$, where $p$ is a fraction, so that Q1 becomes the reference circuit, and putting $y$ for $Q1(1/x-x)$ we have:

$$\text{Fractional output}=\frac{1}{(1-p)}\left(\frac{1}{\sqrt{1+y^2}}-\frac{p}{\sqrt{1+(p.y)^2}}\right) \quad (3)$$

When $(p.y)^2$ becomes much greater than 1, or by expanding the root functions and ignoring all terms of higher power $$\text{Fractional output}=\frac{(1+p)}{2.p^2.y^3} \quad (4)$$

Hence by comparison with the single resonant circuit, the ultimate output, although not zero, is very much less in the differential case. For instance, with $p=0.5$, and $y$ values of 3.16 and 10, the single circuit gives attenuations of −10 and −20 db, while the differential circuit gives attenuations of −20 and −50 db. In order to illustrate the steady state responses of the invention, reference will now be made to Fig. 7, which shows the fractional responses for various circuits plotted as ordinates against the frequency deviation $1/x-x$. Curves 1 and 2 show the responses of single resonant circuits having Q values of 5 and 10. Curve 3 shows the response of two circuits of Q values 5 and 10 if worked in tandem, i. e. by the interposition of a buffer stage so that the net response is the product of the two. Curve 5 shows the response of the same two resonant circuits but used as in the present invention, i. e. differentially, and taking the difference of the magnitudes on each circuit. It is clear that the attenuation of frequencies removed from resonance is much greater in the latter case, and also that the response around resonance is not materially affected. For the sake of comparison, curve 4 shows the response of a single resonant circuit of Q equal to 50.

For a given value of attenuation, the invention gives the effect of a Q value many times that of either of the constituent circuits; for instance the effective Q value is 15 times that of the higher Q circuit for an attenuation of −40 db. The invention therefore enables the simple and practicable design of highly selective circuits, particularly at low frequencies where high Q values are physically impossible, and without making the response at around resonance very critical.

It will be noticed that the residual response of the present differential arrangement at frequencies removed from resonance, is due to the fact that the individual responses are never quite equal, that of the higher Q circuit always being slightly greater. If therefore, a fraction of the voltage V1 be taken by a potentiometer tap on the impedance of V1 in Figs. 3, 4, 5 and 6, then at some frequency removed from resoance the outputs will be equal, and the net output zero. At greater freqnency deviations an output will be obtained, but will be of reversed sign if the difference of the magnitudes is taken by rectification and so may be rendered ineffective on the subsequent responsive apparatus, or will be of insignificant value. The frequency deviation at which a zero output may be so obtained is given by:

$$y^2=\frac{k^2-p^2}{p^2(1-k^2)} \quad (5)$$

where $k$ is the fraction of the output V1 which is taken.

In Fig. 7 curve 6 shows the effect of making K equal to 0.95 for the differential arrangement with Q values of 5 and 10, whilst curve 7 shows the same arrangement with a $k$ value of 0.8. It is apparent that this additional device increases substantially the high attenuation at frequencies removed from resonance, again without material alteration to the response around resonance. If for instance, the resonant frequency be 500 cycles per second, then by using $k=0.8$, infinite attenuation may be obtained at plus or minus 50 cycles removed from resonance, while at plus or minus 12.5 cycles the attenuation is only 2.3 db.

A practical circuit embodiment of the invention will now be described showing a typical manner in which it may be carried into effect. In Fig. 8 the modulated carrier frequency or frequencies are assumed to be present on lines A and B and the respective reception devices are connected thereto in any convenient manner, one such device using the invention being shown in detail. The line voltages are taken to the grid and cathode return lead of a valve V1, which by virtue of the grid-bias cathode resistance $Rc$ and the fact that the valve is of pentode or tetrode type, acts as an amplifier having a very large anode impedance. The alternating anode current, $i$, is therefore unaffected by the anode load impedance variations, and the resonant circuits may therefore be of the shunt type having their resistances connected in parallel.

It is well-known that the configurations of Figs. 4 and 6 may be changed by placing R1 and R2 in shunt with L1, C1 and L2, C2, respectively, and feeding a current $Q1.e/R1$ through the former and a current $Q2.e/R2$ through the latter, without altering the voltages V1 or V2. Since Q1 is $R1/Wo.L1$ and Q2 is $R2/Wo.L2$, it follows that the required currents are $e/Wo.L1$ and $e/Wo.L2$ and if the same current be used, then L1 equals L2. Hence in Fig. 8, and since the current $i$ is the same for both resonance circuits, it follows that $L1=L2$, and $C1=C2$, and the differing Q values are obtained by, and are proportional to, the resistances R1 and R2. The latter have been shown as being comprised by a potentiometer so that adjustment of the arm in situ may be made to secure the desired ratios of Q with commercial components. L1 and L2 are constituted by the primary windings of transformers T1 and T2, the centre-tapped secondaries of which produce full wave rectified outputs on R3 and R4 by means of rectifiers MR1 and MR2 respectively. The rectified outputs are then smoothed by the resistance/capacity circuits R5, C3 and R6, C4, respectively. This method of rectification and smoothing is preferred to the conventional method in which R5 and R6 are deleted, because the smoothing circuit time constant can be much less for the same degree of ripple output.

In order to be able to earth the junction between R3 and R4 so that the effects of longitudinal capacitance transfer on the transformers T1 and T2 may be minimized, it is arranged to take the difference in the rectified outputs by means of the nominally equal ratio potentiometer P. For this purpose the rectified outputs on C3 and C4 are connected in series aiding, as shown by the plus and minus signs, and their junction is taken to the negative supply busbar. The arm of P is conected to the grid of a valve V2, via a grid current limiting resistance $Rg$, and the desired signal is utilized by the anode load L. With the arm of P set at the mid-point, the voltage across the lower part applied to the valve V2 will be one half the difference between the rectified outputs on C3 and C4, while variation from the midpoint setting will have the same effect as taking a fraction of one of the outputs. For instance, if the arm of P be moved towards the negative supply busbar, then the component due to the voltage on C3 in the net output is reduced by comparison with the component due to the voltage on C4, by the ratio of the lower to the upper potentiometer resistances.

It will be noticed that the polarity of the rectifiers has been arranged so that the input to the valve V2 is negative, and a signal in valve V2 is constituted by a reduction in anode current. This is a more convenient arrangement than the alternative of a positive input voltage, when the load L is comprised by a relay, since it avoids the provision of a bias source of low resistance in the cathode lead of valve V2 in order to reduce the normal anode current substantially to zero. In transmission systems in which only the modulations of the carrier frequency are required and not the steady state of the carrier, for example speech frequency modulation, then the valve V2 may be made a low frequency amplifier coupled to the input via a conventional condenser/resistance combination and having the normal cathode bias arrangements. The load L would then be comprised by a loud-speaker, or telephone, or audio-frequency telephone line.

Apart from the obvious use of the invention to the reception of alternating pulse signals transmitted over a multi-channel signal circuit, it is contemplated that the invention may be used in radio telephony where the adjacent channel interference is very bad. For instance, if a carrier frequency of 1 megacycle be the desired signal, and the interfering adjacent channel be 10,000 cycles away, the value of the frequency ratio, $x$, is 1.01, which gives a value for $1/x-x$ of 0.02. Referring to Fig. 7, curve 7, it will be seen that with a $k$ value of 0.8 and a Q1 value of 10, the adjacent channel interference at $1/x-x$ of 0.02 may be reduced to zero. Hence the same effect may be obtained at $1/x-x$ of 0.02 by making Q1 equal to 100, i. e. with the same $k$ value of 0.8. Such a Q value is quite easy to obtain at this carrier frequency, so that the invention is a practicable proposition. In this manner it is possible to use the invention as the prime tuning elements in a radio telephony receiver, making C1 and C2 variable for instance, and incorporating the control P as a variable device with which any given interference may be reduced to ineffective quantities without altering the tuning. In addition, and for severer cases of interference frequency ratio, the superheterodyne principle may be applied to the incoming signal before it is applied to the tuning elements constituted by the invention.

Considering the application of the invention to the reproduction of signals consisting of pulses of alternating current such as are used in multi-channel voice-frequency telegraphy or in automatic telephony, it is clear that both steady state and transient interference must be considered, together with the distortionless reproduction of the pulse time with or without interference. In such systems it is general that the carrier frequencies shall be odd harmonics of some low frequency, in order that the worst intermodulation products over the transmission system shall occur at even harmonic spacings where the selectiveness of adjacent channels is equal and large; such carrier frequencies are also most conveniently generated. Hence the carrier frequencies will be equally spaced throughout the spectrum. Now the attenuation of resonance circuits, and of the invention, is a function of $Q(1/x-x)$, which, for $x$ values close to unity, may be represented by $2Q.Fd/Fo$, where Fd is the difference between the applied frequency and Fo, the resonant frequency. In order that the attenuation to adjacent channels shall be uniform throughout the spectrum it follows that Q must be proportional to frequency. This means that the time constant of the resonant circuits, which governs the attainment of the steady state amplitude, must all be equal, which also satisfies the requirement that the minimum pulse time of the system shall be reproduced with equal faithfulness by all channels. The equal time constant requirement also facilitates and simplifies the design and production of the resonant circuits. In the case of the series resonant circuit form of the invention, Figs. 3 and 5, the resistances $r1$ and $r2$ can have the same values for each channel, their ratio can determine the desired Q ratio (i. e. the $p$ value) and the inductances L1 and L2 can then be equal and the same values for all channels. In the case of the shunt resonant circuit form of the invention, Figs. 4, 6 and 8, the resistances R1 and R2 can have the same values for each channel, their ratio can determine the desired Q ratio (i. e. the $p$ value), and the capacitances C1 and C2 can then be equal and the same values for all channels. These points facilitate the practical manufacture of the invention, and the design of the thermionic equipment for supplying the resonant circuits with alternating power.

As regards the response of the invention to a pulse of input frequency at resonance, it is clear that the normal exponential buildup of a single resonant circuit will be modified. The lower Q circuit causes the buildup of the higher Q circuit to be delayed initially, but hardly affects the later stages at around a time equal to three times the time constant of the higher Q circuits, for Q ratios between at least 1.5 to 3. As calculations would have to be based on a time interval of this order, to ensure substantial attainment of the steady state within the minimum pulse period, the invention does not call for Q values any lower than the normal in this respect.

The response of the invention to a pulse of input of frequency just removed from resonance, shows some advantage by comparison with a single resonant circuit. The characteristic overshoot on the steady state value is obtained on the application of the pulse, but instead of an exponential decay upon removal, another overshoot response is obtained, which tends ultimately to the exponential form due to the higher Q circuit. If, as is normal, the responsive apparatus operates at the half steady state amplitude at resonance (in order to obtain distortionless operation at resonance), then instead of obtaining a negative pulse distortion at frequencies just removed from resonance, the decay over-shoot of the invention will tend to prevent such distortion. It can be shown, for instance, that with a Q ratio of 2:1 there is no distortion for a frequency plus or minus 4% of resonance, that is, when the steady state response is down to about 0.7 of the resonant response. As the circuit must fail when the response falls to 0.5, i. e. at 5% off resonance, it follows that the bandwidth response is practically distortionless, and is of ample width for normal commercial frequency discrepancies.

With regard to the transient interference from adjacent channels, the invention produces a considerable reduction, although since the respective time constants of the two resonant circuits are the determining factor, the degree is not so great as the reduction of steady state interference. Considering the response of one resonant circuit to adjacent channel interference the transient component consists of an exponential term having the time constant of the resonant circuit multiplied by a sinusoidal term having a frequency equal to the resonant frequency and an amplitude substantially equal to the steady state term for $x$ values of from 0.6 to 1.6. The total envelope response consists of an oscillatory effect having a frequency substantially that of the difference between the applied and resonant frequencies and of exponentially decaying amplitude towards the steady state value. Since by means of the invention the steady state amplitudes to such interference are rendered substantially equal, it follows that the net transient output can be obtained by subtraction of the oscillatory envelope functions. In this manner it can be shown that the maximum value of the net transient is about 0.2 times the steady state amplitude of one circuit, over a wide range of difference frequencies. Since the pulse time distortion due to such interference on the desired channel, is proportional to its magnitude, the invention does reduce interference distortion considerably, and to a value which becomes tolerable.

It can be shown that the distortion due to adjacent channel interference is substantially independent of the Q value of the selective circuits, since although the magnitude of the interference is inversely proportional to Q, the slope of the operating point on the desired circuit buildup envelope is also inversely proportional to Q. It is dependent mainly on the magnitude of the interference divided by the frequency difference between channels. Hence the invention by reducing the steady state interference virtually to zero, and the transient interference to 0.2 of the steady state of one circuit, permits of much closer frequency spacing. For instance, with a frequency spacing of 100 cycles, the pulse time distortion assuming the transient interference occurs precisely at the operating and releasing values on the desired circuit, will be about 3 milli-seconds. This value permits of an economic number of channels in, for instance, the normal audio frequency bandwidth, so that the invention may be used on multi-channel telegraph and telephone signalling systems.

By using a small degree of pulse shaping at the sending end (e. g. an exponential envelope pulse), the transient interference magnitude can be reduced to negligible values, without materially affecting the desired channel operating and releasing envelopes.

As mentioned above it is most convenient to use the shunt resonant circuit form, since a high impedance source is readily available in the pentode or tetrode valve, and inductance is available as a source for rectification, permitting a simple full wave rectifier circuit with one side at earth potential. Since the difference effect can only be secured on a voltage basis, then it is unnecessary that the individual resonant circuits, rectifiers and smoothing should work on a power basis. The power required can only be reduced by increasing the values assigned to R1 and R2 (Fig. 8), and this would lead to difficulties in accommodating such high load impedances by the valve V1, and also in choosing suitable values for the rectifier load resistances R3 and R4. However, all these difficulties can be overcome by tuning the secondary of the resonant circuit transformers and by converting R1 and R2 into the load resistances R3 and R4. Complete freedom of choice of the resonant circuit components is then obtained, with the additional advantage that the primary winding may be freely chosen to suit the valve V1. Furthermore, since the maximum primary voltage swing is restricted by the available anode voltage supply, whereas within limits the current swing can be increased at will by using a valve of greater power output, it is then possible to supply not only one differential circuit from V1 but all the circuits required for the various channels, and at a low anode supply voltage. Also, provided the coupling between primary and secondary is reasonable, the series primary winding losses do not affect the performance of the secondary, since the anode impedance is very high, which permits of the use of the smallest practicable wire gauge for the primary. Since the primary will have few turns compared to the secondary, this means that the time constant of the resonant circuit inductance can be almost the maximum permitted by the chosen type of coil, with the result that the working Q values are determined solely by the shunt load resistance. This makes for ease in manufacture and stability of the whole circuit throughout its life.

Fig. 9 shows this preferred form of the circuit, in which two complete channel equipments are drawn, the dotted lines indicating where the remainder may be similarly accommodated; the components of the second channel have the same initial lettering as the first with the addition of a further Figure 2. Taking the first channel as representative, the resonant circuits are comprised by primary windings T1 and T2 connected in series with one another and with the remaining channel primary windings, in the anode circuit of a common pentode or tetrode valve V; the anode and screen voltages being taken from the supply busbars marked positive and negative while cathode resistance Rc provides grid bias for V to act as an amplifier of the line voltages applied to terminals A, B, via an input transformer T. The secondary inductances L1 and L2 are tuned to the same channel frequency by condensers C1 and S2. The sole load resistances R1 and R2 carry the full wave rectified voltages across the centre tapped inductances L1 and L2, and can be adjusted in situ by means of the variable tap to give the desired ration of Q values. The rectified voltages are individually smoothed by R3, C3 and R4, C4, and are applied in series aiding to the potentiometer P1. The voltage between the potentiometer tap and the junction of R1 and R2, which is proportional to the difference in the magnitudes of the resonant circuit voltages, is applied to the grid/cathode of valve V1, via a grid current limiting resistance Rg1, to actuate the relay Ry1. The condenser C5 shunting the relay performs the functions of removing any undesirable ripple current from the relay by forming an elementary low pass filter with the inductance and resistance in the relay arm, and of limiting the impedance of the anode circuit to a value which will permit the valve to operate under non-overloading conditions on application and removal of the input pulse.

By raising the assigned values of R1 and R2, the energy requirements from the source V for a given operating potential on the grid of V1 are reduced, and in addition the values of the condensers C1 and C2 are reduced to an extent where they can be accommodated, together with the bulk of the rectifier and smoothing circuits, in the transformer casing of the inductances L1 and L2. The increased value of inductance required can be met by winding more turns of finer wire, without altering the basic time constant of the coil. By these means the whole of the individual channel equipment, with the exception of the valve relay circuit marked in dashed lines, can be accommodated in one case, resulting in an extremely compact layout. Owing to the freedom of choice given by the present circuit arrangement, the load resistances R1 and R2 can be made of the same value, if desired, when C2 becomes $p.C1$ and the step up ratio of T1 becomes $p$ times that of T2.

It should be noted that with the common source of energy V, gain variations of this source are common to all channels, and can be regarded as, and dealt with, on the same basis as received line level variations, that is by regulating its gain inversely as the level variations, or by regulating the operate and release values of the individual channels in sympathy with the level variations.

Variations of the circuit are of course possible; for instance the potentiometer P1 may be dispensed with if a twin valve be used for V1, in which case the individual outputs from C3 and C4 are fed to the respective control grids and the anodes are commoned to the relay circuit, the screens and cathodes also being commoned.

In the arrangements above described the envelope response to a rectilinear envelope pulse from an adjacent channel is of an exponentially damped oscillatory nature tending towards the steady state value; the oscillatory frequency being substantially that of the difference between the applied and resonant frequencies and the exponential effect having a time constant equal to that of the resonant circuit. Since by the use of means above described the respective steady state values of the two resonant circuits per channel are made substantially equal, then the net transient effect in the wanted signal channel consists of the difference in the respective exponentially damped oscillatory waveforms. This difference is not zero at all times because the time constants of the two resonant circuits are unequal. The maximum difference magnitude can then be used to estimate the time distortion of the signal in the wanted channel by assuming that such interference occurs at both operate and release points on the wanted signal envelope and are additive.

The above transient interference is that obtained on application of the signal in the adjacent channel. Further investigation has shown that the transient interference on cessation is of different waveform although of comparable maximum amplitude. By means of the present invention, this cessation transient interference can be made of zero amplitude as applied to the responsive apparatus, so that the time distortion figures obtained formerly can now be halved since transient interference can now only obtain at either the operate or release point on the wanted signal envelope.

On cessation of a signal applied to a single resonant circuit, the output decays exponentially to zero from the steady state response, and with a time constant equal to the reciprocal of the decrement of the resonant circuit irrespective of the frequency of the applied signal. Since as described above the steady state responses to adjacent channel frequencies are made substantially equal, then on cessation of an adjacent channel signal there is only a net transient output because the time constants of the two exponential decays are different. If the decay envelope waveform could be made identical from both resonant circuits then there would be no transient output on cessation of an adjacent channel signal, and hence no interference with the wanted signal envelope.

One method of obtaining the result consists of applying the envelope waveforms on the resonant circuits to individual non-linear circuits comprising a series rectifier and condenser, whose individual decay time constant was greater than either of the resonant circuits. The rectifier would pass the buildup and steady state responses of the resonant circuit to the condenser as a direct current voltage, and in fact could comprise the means for rectification and smoothing of the alternating resonant circuit voltage. When the signal ceases, the decay envelopes would decrease in magnitude at a faster rate than the decay of the voltage stored on the condenser so that if the time constants of the two rectifier-condenser circuits were made equal, then there would be no net difference output when the steady state magnitudes were equal i. e. to adjacent channel frequencies. It is clear, however, that the decay response (and probably the buildup too) of the wanted signals would also be affected by this circuit, because of the requirement that its time constant be larger than that of either resonant circuit. Hence the minimum permissible pulse time of the receiver would be increased, resulting in a degradation of the wanted signal response over the normal bandwidth.

If, however, the resonant circuit envelope output is applied on a pure voltage basis to a linear circuit comprising a series connected resistance and reactance and the output taken from the latter when this is a condenser, or the former when the reactance is an inductance, then the resulting waveform with time on decay of a signal can be made of the same type from both resonant circuits, provided the time constant of linear circuit 1 equals that of resonant circuit 2 and vice versa. Furthermore the resulting waveform with time is of the same type as was obtained, without the added linear circuits, when the difference between the resonant circuit envelopes is taken for an input frequency equal to the resonant frequency. Hence by these means, when the applied signal frequency is such as to give substantial equality in steady state responses (i. e. adjacent channel signals), then there will be no decay transient produced, and when the applied signal frequency is at or near resonance such as to give a substantial inequality in the steady state responses, then the normal buildup and decay signal waveforms will be produced.

Fig. 10 shows the essential parts of the resonant circuit multi-channel receiver as described with reference to Fig. 9 but embodying the smoothing circuits which are represented in the dotted rectangles A and B. The resonant circuits per channel are comprised by transformers T1 and T2 whose primary windings are connected in series and supplied with a current derived from a high impedance source, and whose secondary windings of inductance L1 and L2 are tuned to the channel frequency by means of condensers C1 and C2. Rectifiers MR1 and MR2 feed the respective resistance loads R1 and R2 with unsmoothed full wave current, and R1, R2 are arranged to be the predominating resistances in the resonant circuits and have values such that the desired ratio of Q values exist between the two resonant circuits. The smoothing circuits R3, C3 and R4, C4, are fed from the voltages on R1 and R2 on a voltage basis by making R3 and R4 say at least ten times R1 and R2, and according to the present invention the time constant R3, C3 is made equal to the time constant of the resonant circuit L2, C2 (i. e. R3, C3 is made equal to $2C2.R2$), whilst $R4.C4$ is made equal to $2C1.R1$. Such values of time constant are clearly adequate for the purpose of smoothing the rectified inputs, for they are equal to the buildup and decay time constants of the resonant circuits, during which transient periods at least three cycles of input frequency will obtain, if serious fortuitous impulse distortion due to the cyclic period is to be avoided. Added to this is the fact that the full wave rectification doubles the input frequency, and the fact that such a linear smoothing circuit operates to the frequency in radians, so that it is apparent that the practical degree of smoothing is adequate. The difference of the resulting smoothed waveform-corrected, direct current outputs on C3 and C4 is taken from the nominal centre tap on potentiometer P and the junction of the condensers, and appears on terminals C and D. It may then be applied to the responsive apparatus via a thermionic valve.

Fig. 11 shows alternative means for smoothing and envelope waveform correction, in which the unsmoothed rectified output voltages from the two resonant circuits are applied as voltages E1 and E2 of like polarity to the control grids of valves V1 and V2, the common connection D corresponding to Fig. 1 and being also the negative supply busbar for the valves. The valves are of pentode or tetrode type, having their screens connected to the positive supply busbar, in order that the anode impedances shall be very high compared to the anode loads. Under these circumstances the equivalent form of the resistance/condenser smoothing and waveform correcting circuit has the condenser connected across the resistance. Hence R3, C3 and R4, C4 in Fig. 11 serve the same purpose as those in Fig. 1, producing smoothed direct currents in R3 and R4 of identical waveform with time on the decay of the signal responses from the two resonant circuits. The difference of these currents is caused to actuate the responsive relay R by having two equal windings on the latter appropriately connected in each anode resistance. The cathode resistances $r1$ and $r2$ may be provided for the purpose of grid bias to the valves, or may be dispensed with (owing to the unidirectional nature of the inputs) if the input voltages are both reversed in sign by appropriate connection of the preceding rectifiers.

Fig. 12 shows another form of smoothing and envelope waveform correcting circuit employing an inductive time constant. The unsmoothed rectified input voltages E1 and E2 of like polarity are applied to the grids of valves V3 and V4, the common connection D being as before. The valves are triodes with their anodes connected to the positive supply busbar, and the smoothing circuits L3, R3 and L4, R4 connected in the respective cathode leads. This form of smoothing circuit must be operated from a low impedance source, and such connection gives a source impedance equal to the reciprocal of the mutual conductance of the valves. The time constants $L3/R3$, $L4/R4$, are made equal to $2C2.R2$ and $2C1.R1$ of the resonant circuits as before, whilst the difference of the currents due to the inputs is obtained to operate the relay R in the same way as for Fig. 11.

Figs. 11 and 12 enable the smoothing and envelope waveform correction circuits to work on a pure voltage basis from the applied inputs without requiring any specific ratio between the impedances of these circuits and those supplying the voltages. In both cases the mutual inductance between the relay windings will cause E. M. F.'s to be applied from one to the other but it is clear that since the object is to produce the same waveform with time in each coil then the effects of such E. M. F.'s will be the same in each circuit, and that they may be neglected if the external resistances and reactances are sufficiently high in comparison with the resistance and reactance of the relay windings. Other forms of circuit accomplishing the same objects of the invention will be readily apparent to those skilled in the art.

A proof that the type of circuit envisaged will give the objects of the invention will now be given. It is clear in the first place, that the unsmoothed rectified output from the resonant circuits can be split into a mean value direct current term and an alternating current term, and that provided the circuits to which they are applied are linear, these two parts may be considered separately and their individual effects summated in the final answer. It is therefore permissible to consider the action of the present circuit to the mean value direct current term from the point of view of envelope waveform correction, and from the point of view of smoothing to consider the alternating current term as a separate item.

If a waveform of the form $e^{-a.t}$ (where $e$ is 2.71828, $a$ is the reciprocal of the time constant and $t$ is time), be applied from a zero impedance generator to a circuit comprising series resistance and reactance of time constant $b$, and the voltage on the reactance (when this is a condenser) or on the resistance (where the reactance is an inductance) be V, then $$V=\frac{n.e.^{-at}-e^{-bt}}{n-1}$$

where $$n=\frac{b}{a} \qquad (6)$$

If suffixes 1 and 2 are applied to all variables other than $t$, to represent the outputs of the two resonant circuits and linear networks, then it can be seen that if $b2=a1$, and $a2=b1$ the two expressions for V1 and V2 become identical. At the adjacent channel frequency the initial magnitudes of the decay exponentials are substantially equal, and may thus be assigned the value unity, as above. Hence there will be no transient output on decay of the adjacent channel signal if $b2=a1$, and $a2=b1$, as described previously.

As regards the outputs for a signal of the resonant frequency, since the inputs are as $1-e^{-a1t}$, and $p(1-e^{-a2.t})$, for buildup, and without the 1 and with reversed sign for decay, and where $p$ is the ratio of the lower Q to the higher Q, then since these are precisely similar input functions as before considered (except for the 1 on buildup), the net output expressed in terms of unity steady state response becomes:

$$\text{Buildup}=1-\frac{e^{-a1.t}-p.e^{\frac{-a1.t}{p}}}{1-p} \qquad (7)$$

while the net decay is the second term with reversed sign. Now consider the corresponding formulae for the mean value of the resonant circuit net output but without the added smoothing circuit (e. g. with a smoothing circuit of negligibly small time constant). This is the difference between the inputs to the specific smoothing circuits, quoted above, divided by $(1-p)$ to bring the answer to unity steady state response, i. e.

Normal net mean value buildup $$=\frac{(1-e^{-a1.t})-p(1-e^{-a2.t})}{1-p}$$

$$=1-\frac{e^{a1.t}-p.e^{\frac{-a1.t}{p}}}{1-p} \qquad (8)$$

since by definition $$a2=\frac{a1}{p}$$

Hence the addition of the smoothing circuits of specific time constants equal to the time constants of the resonant circuits to which they are not connected, causes no change in the buildup and decay time functions at resonance. A slight difference will exist for pulse frequencies near to resonance (i. e. within the normal operating bandwidth), but the effect will be negligible.

The separate question as to whether such smoothing time constants will be adequate for smoothing, has already been dealt with; in fact the values required are about four times those normally used for, say, 20% ripple. Hence the invention not only eliminates the adjacent channel transient on cessation of the signal, retains the original buildup and decay functions at and near resonance, but also gives very substantial freedom from ripple in the direct current output. The adjacent channel time distortion interference figures postulated above may therefore be halved.

It will be understood that the invention is not to be considered as restricted solely to the simplest forms of resonant circuits with the object of obtaining increased attenuation of both steady state and transient responses at a given range of frequencies as broadly speaking the invention consists of two resonant circuits in which the outputs are derived from each circuit which correspond at a certain frequency or range of frequencies and differ at other frequencies, the said outputs being combined in opposition so as to ensure that there is zero or substantially zero output at the said certain frequency or range of frequencies.

A more complex resonance circuit may comprise for instance an additional capacitance in order to produce an additional peak of resonance so that the response curve has two peaks. Such resonance circuit forms an elementary band-pass filter and by arranging for two such resonance circuits to have differing outputs over the pass-band and substantially equal outputs remote from the pass-band or vice versa and then taking this difference between the respective outputs the object of the invention may be obtained.

I claim:

1. In a frequency selective system, a pair of resonant circuits having input circuits serially connected with one another and each of said input circuits being individual to one of said resonant circuits for energization thereof, each of said resonant circuits having the same resonance frequency, each of said resonant circuits having a Q value, the Q value of one of said resonant circuits being different than the Q value of the other of said circuits, means in each of said resonant circuits responsive to their energization from sources of potential to derive a voltage for each of said resonant circuits, one of said derived voltages being proportional to the Q value of said one resonant circuit, the other of said derived voltages being proportional to the Q value of said other resonant circuit, said resonant circuits arranged to combine their respectively derived voltages in opposition to each other, the resultant value of said combined voltages thereby being proportional to the difference of said Q values of the resonant circuits.

2. In a frequency selective system, a pair of serially connected resonant circuits, each of said circuits having the same resonance frequency, each of said circuits having a Q value, the Q value of one of said circuits being different than the Q value of the other of said circuits, input and output connections for each of said circuits, means for supplying potentials to said input connections, means in each of said circuits responsive to the energization of said circuits by said potentials to derive output voltages for said circuits proportional to their Q values, said circuits arranged to combine their respective output voltages at said output connections, the resultant output voltage of said combination of output voltages thereby proportional to the difference of their respective output voltages.

3. An arrangement as claimed in claim 1 in which there is means for rectifying said potential outputs before said outputs are combined.

4. In a frequency selective system, a pair of resonant circuits, each of said circuits having the same resonance frequency, each of said circuits having a Q value, the Q value of one of said circuits being different than the Q value of the other of said circuits, input and output circuits for each of said resonant circuits, said input circuits serially connected with one another, and each being individual to each of said resonant circuits for energization thereof, means for supplying potentials to said input circuits of equal or substantially equal values, means in each of said resonant circuits responsive to the energization of said resonant circuits by said potentials to derive an output voltage for each of said resonant circuits which are proportional to the Q values of said resonant circuits, said output circuits arranged so that the output voltages of each of said resonant circuits are combined in opposition, the resultant voltage of said combination thereby proportional to the difference in the respective outputs.

5. In a frequency selective arrangement, a thermionic valve, an anode circuit for said valve, a pair of resonant circuits connected in series in said anode circuit, each of said circuits having the same resonance frequency, the Q value of one of said circuits being different than the Q value of the other of said circuits, each of said circuits having a capacity, and an inductance, said capacity and said inductance connected in parallel, a resistance connected across both of said circuits, a tap connected between a point on said resistance and the junction point of said circuits, said tap adjustable to other points on said resistance to thereby determine the effective value of voltage to be applied to each of said circuits when potential is applied thereto.

6. A frequency selective arrangement as claimed in claim 5 in which there is a third circuit connected to said pair of resonant circuits, said inductances being the primary windings of a pair of two winding transformers, the secondary windings of said transformers being connected in said third circuit, said resonant circuits effective on energization to derive an output voltage, said output voltage induced in said third circuit by said transformers, said third circuit arranged to combine said output voltages in opposition, the resultant voltage of said combination being proportional to said output voltages of said resonant circuits.

7. In a frequency selective system, a pair of serially connected resonant circuits, each of said circuits having the same resonance frequency, the Q value of each circuit being different, means in each of said circuits for deriving an output voltage proportional to the Q value of their respective circuits, output connections on said pair of resonant circuits, a pair of rectifiers connected thereto for rectifying said output voltages, and a pair of circuits for smoothing said rectified output, said smoothing circuits connected in a series aiding manner, a resistance bridged across said pair of smoothing circuits, said resistance effective to determine the difference of the outputs applied to same by said smoothing circuits.

8. A system as claimed in claim 7 in which there is a thermionic valve, said valve having its input connected to an intermediate point on said resistance and also to the junction point of said pair of smoothing circuits, said thermionic valve controlled by said resistance in accordance with the difference in the outputs of said pair of smoothing circuits.

9. In a multi-frequency selective system, a plurality of frequency selective circuits, each of said plurality of circuits comprised of a pair of resonant circuits, each pair of circuits having a different resonance frequency, the Q value of each resonant circuit being different, a thermionic valve, means for energizing same, an anode circuit for said valve, a plurality of transformers having a primary and secondary winding, said primary windings connected in series in said anode circuit and energized in response to energization of said smoothing circuit, said resonant circuits connected to said transformers and effective on energization of their associated transformers to derive voltages proportional to their respective Q values, and means associated with said pair of resonant circuits to combine the voltage output of their associated circuits in opposition to each other, the resultant value of said combination thereby proportional to the difference of said values of Q of said associated pair of resonant circuits.

10. An arrangement as claimed in claim 9 in which each of said resonant circuits includes one of said plurality of secondary transformer windings, a condenser in shunt of same, a rectifier and a resistance connected in series with said rectifier, said resistance effective to determine the load on said associated transformer, said means including a pair of smoothing circuits connected in a series aiding manner, and a resistance bridged across said pair of smoothing circuits.

11. In a multi-frequency selective arrangement, a plurality of frequency selective channels, one of said channels including a pair of resonant circuits connected to a pair of smoothing circuits, each resonant circuit having the same resonance frequency and different Q values, transient voltages caused by the cessation of a signal to one of the other of said plurality of channels effective to energize said one channel, means in each resonant circuit effective to derive an output voltage proportional to the Q value of same, means in said smoothing circuit for combining said resonant circuit outputs in opposition, said resultant combined output proportional to the difference of the resonant circuit outputs and independent of the value of said transient voltage input.

12. In a multi-frequency selective arrangement, a plurality of frequency selective channels, one of said channels including a pair of resonant circuits and a pair of smoothing circuits connected thereto, each resonant circuit having the same resonance frequency, a different Q value, and a different time constant value, transient voltages caused by cessation of a signal in another of said plurality of channels effective to energize said one channel, means in each resonant circuit of said one channel effective on energization of the circuits to derive an output voltage proportional to the Q value associated therewith, said resonant circuit output applied to said smoothing circuits, a time constant value individual to each smoothing circuit, the time constant value of one of said smoothing circuits being equal to the time constant value of the other of said resonant circuits, the time constant value of the other of said smoothing circuits being equal to the time constant value of one of said resonant circuits, said smoothing circuits arranged to combine their outputs in opposition, said resultant combined output proportional to the difference of the smoothing circuit outputs and independent of the value of said transient voltage input.

13. An arrangement as claimed in claim 12 in which each of said smoothing circuits include a resistance and a condenser, said resistance connected in series with said resonant circuit, said condenser connected in shunt of same, and in which said outputs of said pair of resonant circuits in response to said transient voltage are equal, the resultant combined voltage of said smoothing circuit thereby being of zero value.

14. An arrangement as claimed in claim 12 in which each of said smoothing circuits includes an inductance and a resistance, said resistance connected in shunt of said resonant circuit, said inductance connected in series with same.

15. In a frequency selective circuit, a pair of serially connected resonant circuits having the same resonance frequency, means for applying different currents at different frequencies to said circuits, means in said circuits responsive to said input frequencies to derive a potential output, the output of said circuits being similar at a certain range of frequencies and different at all other frequencies, means for combining the output of said circuits in opposition, said combined output potential being of zero value for a certain range of impressed frequencies.

BERTRAM MORTON HADFIELD.

REFERENCES CITED

The following references are of record in the file of this patent:

UNITED STATES PATENTS

| Number | Name | Date |
|---|---|---|
| 1,546,427 | Affel | July 21, 1925 |
| 1,736,814 | Affel | Nov. 26, 1929 |
| 1,902,031 | Holden | Mar. 21, 1933 |
| 2,096,874 | Beers | Oct. 26, 1937 |
| 2,264,151 | Reid | Nov. 25, 1941 |
| 2,265,826 | Wheeler | Dec. 9, 1941 |
| 2,449,412 | Rathenau | Sept. 14, 1948 |